(12) United States Patent
Schachner

(10) Patent No.: US 11,478,886 B2
(45) Date of Patent: Oct. 25, 2022

(54) ATTACHMENT MEANS FOR CONNECTING PLANE MATERIAL COMBINATIONS IN DRY CONSTRUCTION

(71) Applicant: Raimund Beck Nageltechnik GmbH, Mauerkirchen (AT)

(72) Inventor: Stefan Schachner, Maria-Schmolln (AT)

(73) Assignee: Raimund Beck Nageltechnik GmbH, Mauerkirchen (AT)

( * ) Notice: Subject to any disclaimer, the term of this patent is extended or adjusted under 35 U.S.C. 154(b) by 0 days.

(21) Appl. No.: 16/806,537

(22) Filed: Mar. 2, 2020

(65) Prior Publication Data

US 2020/0198069 A1 Jun. 25, 2020

Related U.S. Application Data

(60) Continuation of application No. 14/711,051, filed on May 13, 2015, now abandoned, which is a division of application No. 13/375,966, filed as application No. PCT/EP2009/004007 on Jun. 4, 2009, now abandoned.

(51) Int. Cl.
| | |
|---|---|
| *B23P 19/06* | (2006.01) |
| *F16B 15/06* | (2006.01) |
| *F16B 25/00* | (2006.01) |

(52) U.S. Cl.
CPC .............. *B23P 19/06* (2013.01); *F16B 15/06* (2013.01); *F16B 25/0021* (2013.01); *Y10T 29/49833* (2015.01)

(58) Field of Classification Search
CPC .. B23P 19/06; F16B 25/0021; F16B 25/0026; F16B 25/0031; F16B 25/0036; F16B 25/10; F16B 25/106; Y10T 29/49947; Y10T 29/49963
USPC .......................................... 411/477, 478, 922
See application file for complete search history.

(56) References Cited

U.S. PATENT DOCUMENTS

| | | | |
|---|---|---|---|
| 71,166 A | 11/1867 | Harvey | |
| 264,479 A | * 9/1882 | Rogers | .................... F16B 25/00 411/417 |
| 408,751 A | 8/1889 | Rose | |
| 1,418,844 A | 1/1890 | Kay | |
| 2,005,672 A | 7/1933 | Chaffee | |
| 2,609,604 A | 9/1952 | Sprague | |
| 3,748,949 A | 7/1973 | Dreger | |

(Continued)

FOREIGN PATENT DOCUMENTS

| | | |
|---|---|---|
| DE | 7029451 | 11/1970 |
| DE | 3107403 | 2/1982 |

(Continued)

*Primary Examiner* — Jason L Vaughan
(74) *Attorney, Agent, or Firm* — Berenato & White, LLC

(57) ABSTRACT

The present invention relates to attachment mean (1) for connecting plane components in dry construction, in particular for fixing two-dimensional construction material to a metallic substructure, having a shaft (2) on one end region of which a point (3) and on the other end region of which a head (4) are formed, a fine thread (5) being formed on the shaft (2) in order to increase extraction values of the attachment means (1), at least in regions, a number of grooves (6) being provided on the shaft (2) which extend substantially parallel to the central axis (X) of the shaft (2).

21 Claims, 2 Drawing Sheets

(56) References Cited

U.S. PATENT DOCUMENTS

| | | | |
|---|---|---|---|
| 3,865,006 | A | 2/1975 | Massoney |
| 4,367,836 | A | 1/1983 | Hodson |
| 6,413,326 | B1 | 7/2002 | Rallis |
| 6,872,042 | B2 * | 3/2005 | Panasik ............... F16B 15/06 411/451.1 |
| 7,063,491 | B2 | 6/2006 | French |
| 2012/0096701 | A1 | 4/2012 | Schachner |
| 2015/0290754 | A1 | 10/2015 | Schachner |

FOREIGN PATENT DOCUMENTS

| | | |
|---|---|---|
| EP | 1850016 | 10/2007 |
| WO | 9905421 | 2/1999 |

* cited by examiner

ATTACHMENT MEANS FOR CONNECTING PLANE MATERIAL COMBINATIONS IN DRY CONSTRUCTION

CROSS-REFERENCE TO RELATED APPLICATION AND CLAIM TO PRIORITY

This application is a continuation of U.S. patent application Ser. No. 14/711,051, filed May 13, 2015, which is a divisional of U.S. patent application Ser. No. 13/375,966, filed Dec. 2, 2011, which is a national phase application of PCT Application No. PCT/EP2009/004007, filed Jun. 4, 2009, the disclosures of which are incorporated herein by reference.

SUMMARY AND BACKGROUND

The present invention relates to attachment means, in particular a screw nail, for connecting plane components in dry construction, in particular for fixing plane construction material to a metallic substructure, the attachment means having a shaft on one end region of which a point and on the other end region of which a head are formed, a fine thread being formed on the shaft in order to increase extraction values of the attachment means, at least in some regions.

These types of attachment means are generally known and are often called screw nails. With temporary use screw nails according to the prior art can often no longer be removed from the components to be connected. With attempts to turn-out screw nails according to the prior art it could be observed that the thread in the thin holding plates of the metallic substructure often slips, and that one can not grip the screw nail in the holding plate. In those regions where plasterboard or wooden panels are attached over metal substructures made of thin sheet metal, with the screw nails according to the prior art it is only possible with difficulty to unscrew the screw nails which have been used from the components.

However, in the prefabricated house industry whole house walls are fully assembled on the factory floor. After positioning the house at the building site the installers must often open up individual parts of the prefabricated walls in order to lay their cables or pipes correctly. For this purpose it must be possible to partially remove the plaster and wooden elements again which are already attached. If the screw nails used cannot be removed sufficiently, this often leads to the panels being damaged, and this in turn leads to increased temporal and financial expenditure.

In document DE 70 29 451 a screw nail is described on which a fine thread is provided in order to increase the extraction values of the screw nail and which is overlaid by a steeply extending, multi-threaded steep thread. The steep thread is formed by grooves arranged in helical lines which are designed such that the screw nail turns into the components to be connected when driven in. By providing the steep thread it should be possible, as the screw nail penetrates, for the material thus displaced to pass into the steep thread. At the same time, it should be possible due to the fine thread for shearing processes of any type, and so destruction of the structure of the material to be connected, to be prevented. In this way it should be possible with a further turn of the screw nail driven in for a thread to be cut into the material remaining in the steep thread by the fine thread so that it should be possible to release the screw nail and also to reinsert it.

However, it has been shown by trials that when specifically using wooden materials or also plaster boards, this effect does not occur. It was not actually possible to form a thread in these connection partners by turning the screw nail. Therefore in dry construction it could be observed that with the materials predominantly used a screw nail according to the prior art can only be insufficiently unscrewed since only the metallic substructure has sufficient strength in order to form a thread therein. Since, however, due to the helically formed design of the grooves the screw nail, when inserted, penetrates into the material by rotation, the region of the sheet metal to be penetrated is almost totally chipped away by the screw nail in accordance with its circumference or the material is totally displaced. Consequently, the connection is only held by the material displaced by the screw nail being inserted in the insertion direction pressing against the shaft from the outside. Subsequent cutting of a thread in the material of the substructure is not possible, however, because the shaft and the fine thread of the screw nail presses the material to the side or does not even come into contact with it, and so the screw nail rotates in the construction material.

A further problem which occurs when attaching plasterboard or wooden panels onto metal substructures made of thin sheet metal is that the attachment means connects insufficiently to the supporting substructure, and this leads to a loose connection which cannot assume any holding function. These screw nails incorrectly inserted into the material are therefore removed in practice. Upon removing the screw nails the effect also often arises that the nails cannot be screwed back in and turn blankly, and this has a negative effect with incorrect insertions.

In order to avoid this and to provide a screw nail which is also suitable for use with plane construction material such as Rigips plasterboards or wooden panels and a metallic substructure such as, for example, a sheet metal structure, it is proposed in document DE 31 07 403 C1 to improve the hold of the screw nail in the sheet metal structure by it being provided with a synthetic coating up the end of its insertion part. In this way it should be possible for the insertion end with the synthetic coating to interlock into the edges of the hole in the sheet metal substructure. For this purpose the threaded region of the screw nail is driven totally through the substructure until a thread-free region of the shaft provided with a synthetic ledge is pressed into the sheet metal substructure which, due to the clamping which is established between the synthetic and the sheet metal, prevents the nail from being pulled out of the substructure unintentionally.

The injection of an appropriate synthetic around the screw nail increases the costs of production of the screw nail on the one hand due to the increased time requirement and on the other hand due to the increased material requirement.

It is therefore the object of the present invention to provide attachment means which are inexpensive to produce and, by maintaining reliable anchoring to the supporting metallic substructure, provides release of the attachment means if so required.

This object is achieved according to the invention in that a number of grooves are provided on the shaft which extend substantially axially to a central axis of the shaft.

The axis-parallel alignment of the grooves makes it possible for the attachment means to be driven into the material combination to be connected by means of an automatic nail gun device substantially without any rotational movement. Thus, providing the grooves aligned axis-parallel to the shaft it is possible for small material projections to retain in the connection region with the substructure when the attachment means penetrate into the metallic substructure in accordance with the design and number of grooves. Upon unscrewing the attachment means, these material projections provide a grip for the fine thread formed in the shaft. When turning the attachment means in the sheet metal structure the fine thread can cut thread turns into the material projections. Consequently the attachment means do not turn through the sheet metal but grip onto the material projections and can be unscrewed from the connection region again.

In order to be able to guarantee uniform unscrewing of the attachment means from the connection region, for example by means of an appropriate electric screwdriver, it can be advantageous to arrange the grooves evenly distributed over the peripheral surface of the shaft. Of course an asymmetrical arrangement of the grooves is also conceivable.

In one exemplary embodiment of the present invention the grooves are arranged such that they extend from the point along a section of the shaft which coincides with the metallic substructure.

Due to the fact that the grooves can reduce the extraction values of the attachment means, the grooves should have the smallest possible width, ideally so that the bars forming in the substructure do not buckle when inserting the screw nail.

For this reason it can also be advantageous to form the grooves, not over the whole length of the shaft, but only in the region which coincides with the metallic substructure, i.e. for example from the tip to the end of the region which comes into contact with the metallic substructure when knocking in the screw nail.

The grooves can have a semi-circular, V-shaped or U-shaped cross-sectional profile here. Other embodiments of the cross-sectional shapes of the groove are also conceivable.

In order to enable particularly smooth-running and simple unscrewing of the attachment means from the material combination to be connected, in one exemplary embodiment the fine thread is provided with self-cutting thread flanks.

One preferred embodiment proposes designing the fine thread as a flat saw tooth thread in order to increase the extraction values. Here the flat fine thread can be a double thread.

In order to also be able to insert the attachment means into metallic substructures with a sheet metal thickness of between 0.5 mm and 1.5 mm, in a further exemplary embodiment it is heat-treated, and in particular austempered.

BRIEF DESCRIPTION OF THE DRAWINGS

Further advantageous embodiments of the invention can be taken from the sub-claims and from the following drawings.

These show as follows.

DETAILED DESCRIPTION OF EXEMPLARY EMBODIMENT(S) AND EXEMPLARY METHOD(S)

Figure 1:
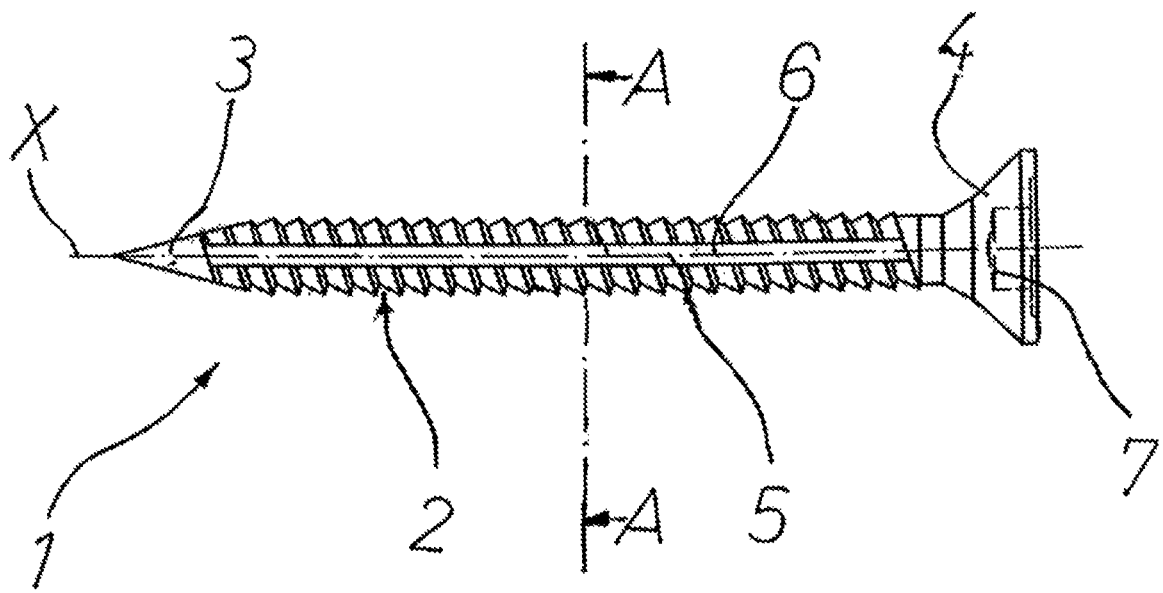
FIG. 1 a perspective illustration of an attachment means according to the invention in the form of a screw nail.

FIG. 1 shows attachment means 1 according to the invention in the form of a screw nail 1.

The screw nail has a shaft 2 on one end region of which a point 3 and on the other end region of which a head 4 are formed. In order to increase extraction values of the attachment means 1 a single-threaded fine thread 5 is formed on the shaft 3 as a flat saw tooth thread. On the shaft 2 three grooves 6 are provided which extend substantially parallel to a central axis (X) of the shaft 2 along its peripheral surface.

In the head 4 a recess 7 is provided in the form of an internal hexagon in order to be able to unscrew the attachment means 1 with a screwdriver designed to complement the latter. Of course it is also possible to form the recess 7 as a cross slot or as a simple slot.

The attachment means 1 are heat treated, in this exemplary embodiment austempered. The grooves 6 extend over the whole region of the shaft 2 provided with the fine thread 5. In one exemplary embodiment not shown the grooves 6 only extend over a partial section of the shaft 2 provided with the fine thread 5, namely the region from the point 3 onwards which comes into contact with a metallic substructure (not shown) when driving in the attachment means 1.

Figure 2:
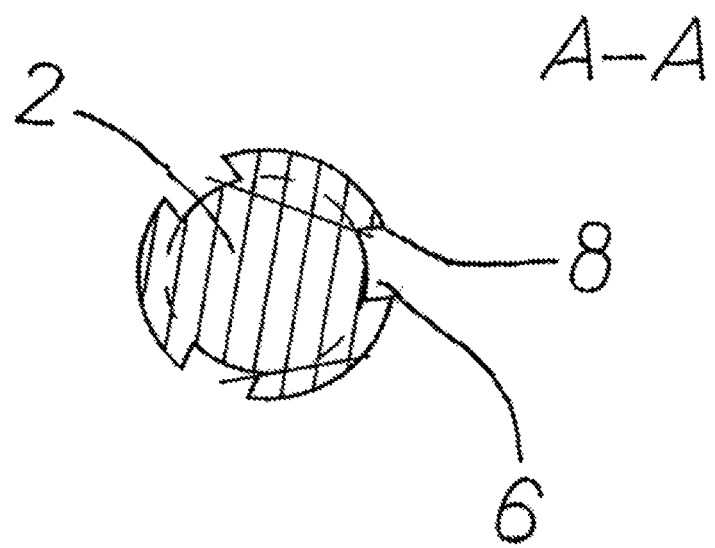
FIG. 2 a cross-section along section line A-A according to FIG. 1.

As can be seen from FIG. 2, the grooves 6 have a depth which corresponds to the depth of the fine thread 5 formed on the shaft 2. The fine thread 5 has self-cutting thread flanks 8.

If the screw nail 1 is driven into the components, part of the sheet metal structure is displaced downwards and presses against the shaft 2 or the fine thread 5 such as to form a force-fit connection. Material projections remain in the region of the grooves 6. If the screw nail 1 is to be removed from the component again, the latter is turned over the recess 7 in the head 4 and cuts a thread section into the sheet metal of the substructure, and this enables simple unscrewing of the screw nail 1 from the component.

Figure 3:
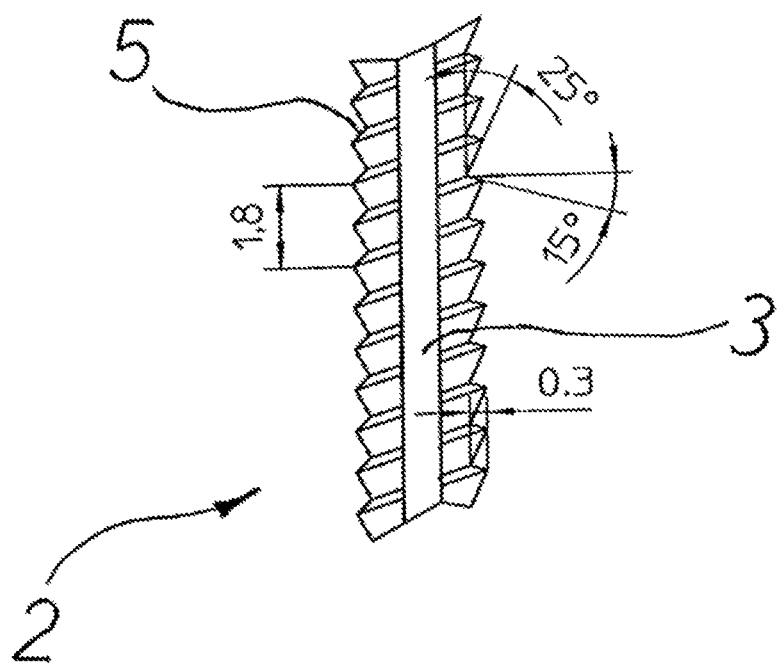
FIG. 3 a diagrammatic partial illustration of the shaft according to FIG. 1.

FIG. 3 shows a partial illustration of the shaft 2 which, in this exemplary embodiment, has a double-threaded fine thread 5. The values shown here, such as e.g. the flank angles, can optionally be adapted to the different areas of application, in particular to the different types of material to be connected, and therefore are to be considered here as just one possible embodiment, and so not as restrictive.

The invention claimed is:

1. A screw nail comprising
   a shaft having a first end forming a point and a second end forming a head;
   a fine thread formed on the shaft; and
   three linear grooves being provided on the shaft and each of the grooves extending linearly parallel to a central axis of the shaft,
   wherein the screw nail is heat treated, and wherein each of the three grooves has a depth which is the same as a depth of the fine thread.

2. The screw nail of claim 1, wherein the grooves are evenly distributed over the peripheral surface of the shaft.

3. The screw nail of claim 1, wherein the grooves extend from the point over a lower partial section of the shaft.

4. The screw nail of claim 1, wherein the grooves have a semicircular, V-shaped or U-shaped cross-sectional profile.

5. The screw nail of claim 1, wherein the fine thread has self-cutting thread flanks.

6. The screw nail of claim 1, wherein the fine thread is in the form of a flat saw tooth thread or is double threaded.

7. The screw nail of claim 1, wherein each of the grooves extends the entire length of the shaft that is covered with the fine thread.

8. A method for connecting plane components in dry construction, comprising the steps of:
   a) providing the screw nail of claim 1; and
   b) securing a planar construction material and a metallic substructure underlying the construction material by driving the screw nail, substantially without rotation about the central axis, through the construction material and into the metallic sub structure.

9. The method of claim 8, wherein step b) involves the use of an automatic nail gun device.

10. The method of claim 8, wherein each of the grooves has a depth which is the same as a depth of the fine thread.

11. The method of claim 8, wherein the grooves are evenly distributed over the peripheral surface of the shaft.

12. The method of claim 8, wherein the grooves are arranged such that they extend from the point over a lower partial section of the shaft.

13. The method of claim 8, wherein the grooves have a semicircular, V-shaped or U-shaped cross-sectional profile.

14. The method of claim 8, wherein the fine thread has self-cutting thread flanks.

15. The method of claim 8, wherein the fine thread is in the form of a flat saw tooth thread or is double threaded.

16. The screw nail of claim 8, wherein each of the grooves extends the entire length of the shaft that is covered with the fine thread.

17. The method of claim 8, wherein the screw nail is heat treated.

18. The method of claim 8, wherein the screw nail is austempered.

19. The method of claim 8, wherein the securing step causes part of the sheet metal to be displaced toward and to press against the shaft.

20. A method for connecting plane components in dry construction, comprising the steps of:
   a) providing the screw nail of claim 1; and
   b) securing a planar construction material and a metallic substructure underlying the construction material by driving the screw nail, substantially without rotation about the central axis, through the construction material and into the metallic substructure so that part of the sheet metal is displaced toward and presses against the shaft.

21. The method of claim 20, wherein the grooves are evenly distributed over the peripheral surface of the shaft.

* * * * *